(12) United States Patent
Williams et al.

(10) Patent No.: US 8,752,481 B2
(45) Date of Patent: Jun. 17, 2014

(54) BLENDER AIR INTAKE SNORKEL FOR COUNTERTOP OR IN-COUNTER INSTALLATIONS

(75) Inventors: Brian Paul Williams, Midlothian, VA (US); Steven W. Ashworth, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1458 days.

(21) Appl. No.: 11/870,293

(22) Filed: Oct. 10, 2007

(65) Prior Publication Data

US 2009/0095459 A1  Apr. 16, 2009

(51) Int. Cl.
   *A23N 1/00* (2006.01)

(52) U.S. Cl.
   USPC ............................. 99/509; 366/197; 366/199

(58) Field of Classification Search
   USPC ................ 366/205, 197, 199; 310/51; 99/509
   See application file for complete search history.

(56) References Cited

U.S. PATENT DOCUMENTS

| | | | |
|---|---|---|---|
| 3,575,524 A | | 4/1971 | Adajian |
| 3,901,484 A | | 8/1975 | Ernster |
| 3,930,558 A | * | 1/1976 | Schnell et al. ................ 181/200 |
| 4,620,476 A | | 11/1986 | Brym |
| 4,708,487 A | | 11/1987 | Marshall |
| 5,273,358 A | * | 12/1993 | Byrne et al. .................. 366/205 |
| 5,810,472 A | | 9/1998 | Penaranda et al. |
| 6,069,423 A | | 5/2000 | Miller et al. |
| 6,499,873 B1 | * | 12/2002 | Chen ............................ 366/197 |
| 6,571,908 B2 | | 6/2003 | Bohannon et al. |
| 6,680,551 B2 | | 1/2004 | Bates et al. |
| 2006/0007778 A1 | | 1/2006 | Tai |
| 2007/0133347 A1 | | 6/2007 | Mok et al. |

FOREIGN PATENT DOCUMENTS

CN          2740111 Y      11/2005

OTHER PUBLICATIONS

First Office Action from China Patent Office; Serial No. 200810167315.X; issued Apr. 21, 2010; 8 pages.

* cited by examiner

*Primary Examiner* — Brian Jennison
(74) *Attorney, Agent, or Firm* — Alexander D. Raring

(57) ABSTRACT

A blender with an air intake snorkel where the snorkel extends away from a motor housing provided by the blender is provided. The snorkel includes an air intake opening, an outlet opening, and a conduit fluidly connecting the intake and outlet openings. In one preferred embodiment, the snorkel includes a cap connected to the snorkel wherein the cap partially obstructs access to the intake opening in order to prevent contamination of the conduit. The outlet opening fluidly communicates with an inlet aperture provided by the motor housing. In use, an electric motor contained by the housing actuates a fan. The fan pulls air through the intake opening, conduit, and outlet opening. The air enters the housing via the inlet aperture where it acts to cool the electric motor. In one preferred embodiment, the appliance is a blender and the motor housing comprises a blender base that is installed on a countertop or in-counter (i.e., a portion of the blender extends into or through the plane defined by a countertop). The air intake snorkel reduces contamination of the interior of the appliance, provides efficient airflow for motor cooling, and reduces the re-circulation of warm appliance exhaust air into the motor housing.

14 Claims, 7 Drawing Sheets

BLENDER AIR INTAKE SNORKEL FOR COUNTERTOP OR IN-COUNTER INSTALLATIONS

The present invention relates to a blender air intake for countertop or in-counter blender installations wherein the air intake extends away from the body of the blender. More specifically, the blender air intake as disclosed herein provides a snorkel function in that the intake supplies cool, dry air drawn from a point away from the blender's motor housing, and the air is operable to cool an appliance motor.

BACKGROUND OF THE INVENTION

Kitchen countertop appliances incorporate electric motors operable to slice, dice, crush, mix, blend or otherwise process food and drink products. The motors, generally operating at speeds of thousands to tens of thousands of rotations per minute, must be cooled to operate efficiently. Typically, electric appliance motors are cooled by a fan integral to the motor wherein the fan blows air on or draws air over the motor during operation. Unfortunately, many existing appliance cooling systems are inefficient. This commonly occurs because the appliance, including blenders, moves an insufficient volume of cooling air due to vents of inadequate surface area. Typical air intakes are often located in close proximity to an exhaust outlet resulting in recirculation of hot air. These inefficiencies may result in reduced cooling.

In addition to cooling the motor, the inefficient air flow and fan operation creates noise. An inefficient air flow particularly can create a substantial noise level. If an engineer tries to compensate for the poor cooling of a motor with a more powerful fan, then the result is to create even more noise.

Perhaps the most difficult challenge to increasing appliance motor cooling efficiency is the placement of the air intake and exhaust outlet. Typical air intakes for blenders are designed as grates or sieves in the blender base housing. The air flow generated by the motor's fan causes air to enter the intake where it is then routed over the motor as desired. However, the typical grate/sieve construction found in modern blenders has several potential shortcomings. Namely, fluid or food on the countertop or fluid or food spilled from the blender can enter the open and exposed intake due to operator negligence. In some cases, particularly where a chilled or iced food or drink product is being processed, condensation on the exterior of the blender may enter the intake. Blender manufacturers and owners have sought to prevent this type of contamination. This is particularly true as more blenders incorporate complicated electronic controls and components.

Cooling air pulled through the motor housing exchanges heat with the motor before being expelled from the appliance as exhaust air. A blender's exhaust air flow is most commonly directed to the rear or to the bottom of the blender. The proximity or location of the air intake to the exhaust outlet often causes warm exhaust air to be recirculated into the motor chamber thereby greatly reducing the appliance's cooling efficiency. Baffles are commonly used to reduce the intake of warm exhaust air (see, e.g., U.S. Pat. No. 5,273,358) by acting as a physical barrier between the air intake and exhaust outlet.

Typical blenders are also not constructed with in-counter installations in mind (i.e., a portion of the blender extends into or through the plane defined by a countertop), and they are certainly not designed with both countertop and in-counter installations in mind. Therefore, current blender air intake and outlet assemblies are not conducive to, or would preclude, in-counter appliance installations. Yet, in-counter installations provide potential benefits that include improved aesthetics, reduced countertop space (increased clearance to above-counter cabinets), and sub-cabinet exhaust flow. Ideally, an improved air intake assembly would be designed to operate with both countertop and in-counter blender installations.

When a conventional blender is installed in-counter, the typical 'grate'-style air intake is moved to a point immediately proximate to the countertop's upper surface, which only increases the possibility of contamination. Specifically, standing fluid or loose food items might be pulled into the blender's motor housing. An in-counter installation may also mean that a typical air intake is located beneath the upper surface of the countertop. A sub-countertop air intake is thought to be detrimental as the space under a countertop can contain warm, recirculated, and/or stagnant air that could impede motor cooling.

In light of the above and other shortcomings with current blender motor cooling regimes, there is a need for a new intake assembly that is operable with both countertop and in-counter installations that provides efficient cooling and relatively quiet airflow over a blender motor. Ideally, an improved intake would preclude or reduce the possibility of interior contamination relative to existing air intake assemblies. A blender air intake snorkel in accordance with the following description is thought to solve one or more of these or other needs.

SUMMARY OF THE INVENTION

A blender with an air intake snorkel for countertop or in-counter installations is provided. The air intake snorkel provided herein reduces noise, creates an efficient air flow, and reduces the possibility of contaminating a blender motor housing with fluids or food stuff. The result is an improved cooling system for blender electric motor housings.

A blender with the air intake snorkel comprises a motor, a motor housing, and a snorkel assembly extending from the motor housing. The motor housing is adapted to contain an electric motor wherein the motor includes a fan operable to cool the motor by drawing or pushing air across the motor. The housing comprises an air inlet aperture, a shroud to contain the motor within the housing, and an air passageway at least defining a fluid path from the inlet aperture around the motor.

In one embodiment, the housing includes an upper housing and a lower housing selectively secured together to form the motor housing. The upper housing comprises the air inlet aperture and shroud. The lower housing comprises an exhaust aperture whereby air in the air inlet passageway moves over the motor and exits the housing via the exhaust aperture.

The housing may rest on the countertop or be supported by legs supported by the countertop. In another embodiment, the lower housing is selectively removed and the lower edge of the upper housing fits flush against the countertop. The motor, at least partially surrounded by the motor shroud, extends into or through the plane defined by the countertop. For this in-counter installation, cooling air moves over the motor and fan, which are enclosed by the shroud, before dispersing into the air space beneath the countertop and shroud. The exhaust outlet provided by the shroud is roughly of the same area as the housing's inlet aperture and snorkel's intake opening, as defined below.

The air intake snorkel assembly defines a snorkel conduit that fluidly connects a snorkel intake opening to a snorkel outlet opening. The snorkel assembly extends away from the motor housing. The assembly is secured to the housing or is integral with the motor housing.

In one embodiment, the snorkel further comprises a protective cap adjacent the intake opening. The cap is operable to shield the intake opening from, or reduce the possibility of, contamination from fluid, food, or other foreign objects. The cap partially obstructs access to the intake opening while allowing an air flow past the cap and into the intake opening. Air flow caused by operation of the fan causes the fluid movement of cooling air through the snorkel conduit to the outlet opening, inlet aperture, and air passageway. With the optional cap in place, and in one preferred embodiment, an upward, vertical air flow is created prior to the air entering the intake opening. Specifically, cooling air moves upwards between the snorkel body and cap before entering the intake opening. The vertical air flow reduces the possibility of vacuuming solids or fluids from the space proximate to the intake opening.

In another preferred embodiment, the conduit first extends roughly or generally horizontally away from the motor housing. An elbow or corner turns the conduit vertically. Therefore, the intake opening is facing vertically (i.e., entry to the intake opening occurs along a vertical axis), and the optional cap at least partially covers the intake opening. Air is pulled upwards past the cap before passing through the intake opening, moving down and then laterally through the conduit, and exiting the conduit via the outlet opening. The conduit is internally rounded at the elbow or juncture to create smooth/quite air flow.

A blender intake snorkel in accordance with the disclosure herein efficiently addresses at least one of the above or other identified shortcomings associate with existing blender air intake structures. For instance, extending the air intake away from (and/or upwards from) the motor housing provides fresher/cooler air compared to standard blender intakes. In a preferred embodiment, the housing is cubical in that it has four substantially vertical walls, a top side, and bottom side, the top and bottom sides enclosing the space between the four substantially vertical walls. The intake opening is located in the plane of the top wall ('in-plane') or above the top side of the blender base (i.e., above the plane defined by the top side of the housing). The re-circulation of warm exhaust air through the motor housing is reduced relative to conventional blenders. The placement of the intake opening is thought to draw cooler air into the blender relative to an intake opening or inlet aperture located beneath the top side of the blender. The location of the intake opening reduces or eliminates the possibility of food, drink or other contaminants being vacuumed by the fan into the housing.

In addition, the snorkel is operable with a countertop or in-counter installation of the blender. With a standard air intake design, an in-counter installation could mean the intake is near or below the countertop level. The air intake snorkel as disclosed herein moves the intake above and away from the countertop for cooler air with a lower probability of contaminating the appliance motor housing. A cap prevents against the accidental entry of solids or fluids entering from a point above the intake opening. In addition, the cap creates a vertical air flow that reduces the possibility of vacuuming solids or fluids from points proximate to the intake opening.

Further features and advantages of the air intake snorkel will become apparent to those of skill in the art from the following detailed description of preferred embodiments taken in conjunction with the accompanying drawings.

DETAILED DESCRIPTION OF THE PREFERRED EMBODIMENTS

As will be described in detail herein, the supply of an air flow through a blender motor housing (a.k.a., a 'blender base') can be improved by an air intake snorkel to increase cooling effect, reduce noise, and reduce or eliminate contamination of the air intake. An air intake snorkel may also be designed for selective countertop and in-counter installations of the same blender. The possible variations of the snorkel are adaptable for use with many existing motor housings. Accordingly, the specific structure disclosed should not and is not a reasonable limitation of the scope of the present invention. The following describes certain preferred embodiments of an air intake snorkel and a blender with such a snorkel.

Figure 1:
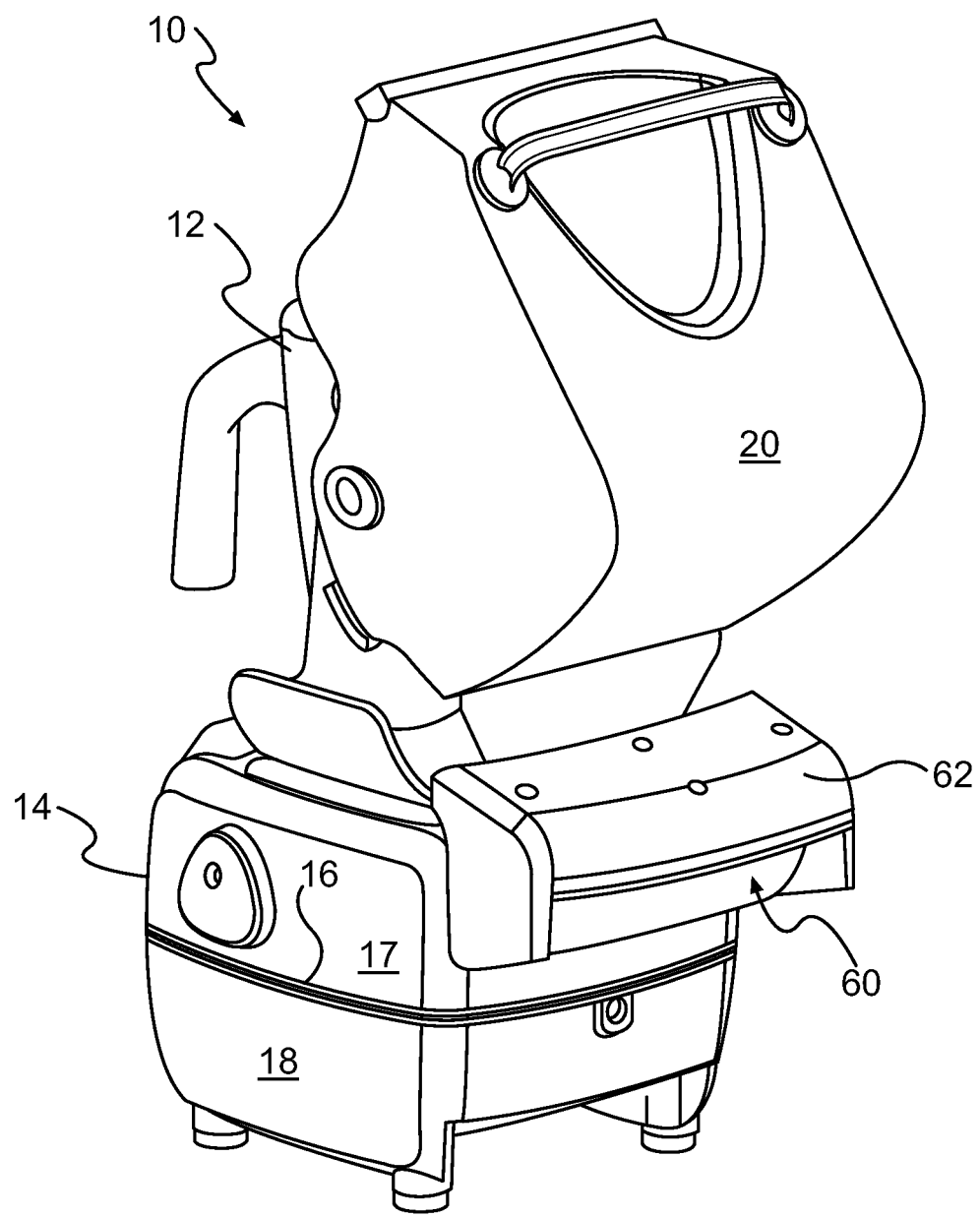
FIG. 1 is a perspective view of a blender including a motor housing and air intake snorkel in accordance with present disclosure.

Turning first to FIG. 1, there is illustrated a blender 10 having a blender jar 12 mounted onto the blender base or motor housing 14. Housing 14 may be an integral, one-piece shell to enclose a motor and the corresponding appliance electronics. The specific shape of the motor housing is not critical. Here, the blender base is a rectilinear motor shell with four substantially vertical walls, a top side, and a bottom side. The shape of the housing could vary. The motor housing optionally includes legs (illustrated but not labeled), which support the blender on a countertop or support surface.

In another embodiment, and as illustrated in the attached figures, housing 14 may include an upper housing 16 with a top side 22 and a lower housing 18. An optional gasket 17 is placed between the walls defined by the upper and lower housings. Gasket 17 provides a sound and fluid resistant seal between the upper and lower housings. The upper and lower housings are joined around a periphery that roughly divides the housing into an upper half and a lower half. Overall, housing 14 is effectively a shell creating a hollow space for an electric motor and any associated electronic controls or components.

An optional rotatable enclosure 20, as known in the art, may operate to enclose jar 12 during operation of the blender. The specific operation and standard features of the blender is not important for the purposes of this disclosure and will not be discussed in detail.

An air intake snorkel assembly 60 is illustrated as extending away and upwards from housing 14. The air intake is a snorkel in that displaces a conventional air intake that would be found on the face of the motor housing and moves the intake away from the motor housing so as to supply cool, clean air. Snorkel 60 can be connected or integrally molded to any surface of housing 14. In a preferred embodiment, snorkel 60 is located to the rear of the blender. An optional cap 62 at least partially covers the snorkel's intake opening.

In another preferred embodiment, snorkel assembly 60 extends from upper half of housing 14 or from upper housing 16. The placement towards the top of housing 14 ensures the snorkel is drawing in fresh, cool air. The higher placement on the motor housing also assists in-counter installation functionality by moving the intake above the surface of a countertop (see, e.g., FIG. 2C). Again, the specific placement of the snorkel on housing 14 or upper housing 16 can be customized or altered as needed. However, it is generally thought that a rearward-extending snorkel 60 is at least more aesthetically pleasing and more ergonomically functional.

It should be noted that while the primary preferred embodiment described herein relates to a blender motor, blender housing/base, and a blender air intake snorkel, the teachings herein may be applied to many different types of appliances that have electric motors that need to be cooled during operation. Inclusion of the disclosed snorkel assembly with a blender base is thought to be advantageous as blender air intakes are generally proximate to the surface of the countertop, and many typical blender air intakes are not conducive for use with in-counter installations. Benefits of using the disclosed snorkel with other kitchen appliances will become apparent to one of skill in the art.

Figure 2A:
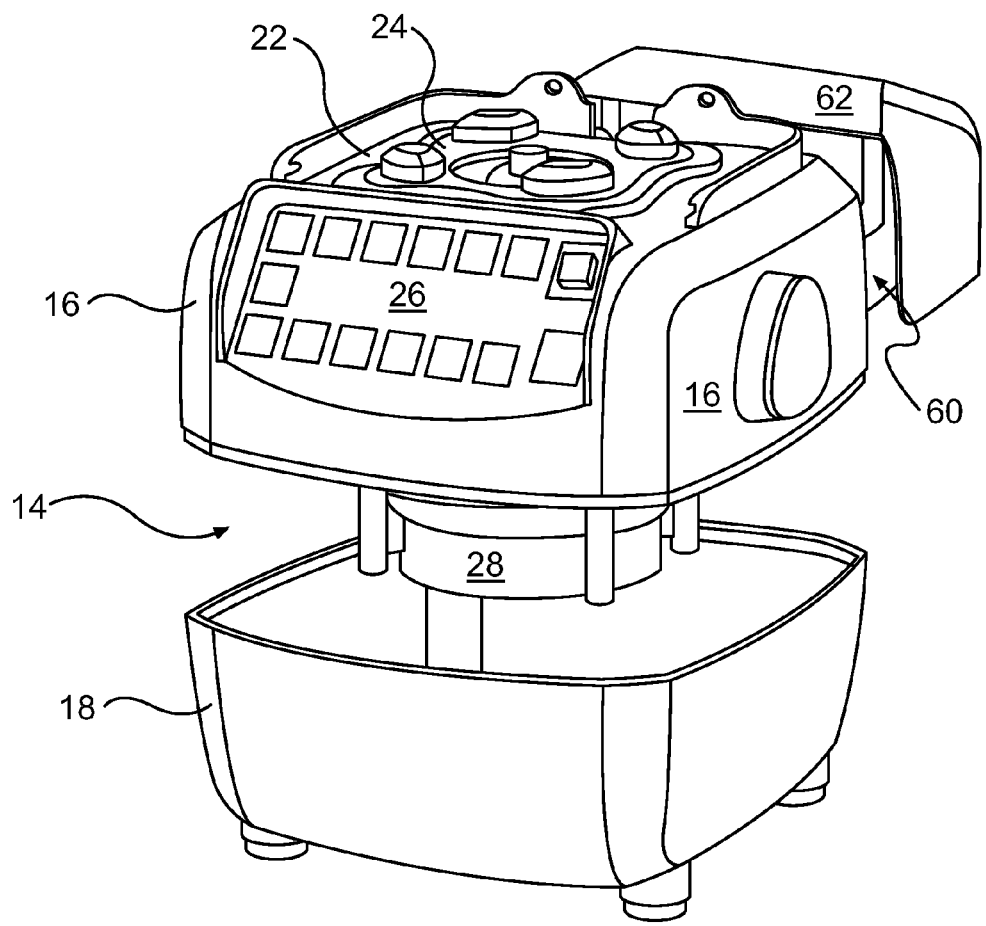
FIG. 2A is a perspective, exploded view of the motor housing comprising an upper housing and a lower housing, as described herein.

FIG. 2A is an exploded view of motor housing 14. The housing 14 includes a top 22 with a blender jar pad 24. Pad 24 mates or otherwise supports jar 12 on top 22. A control panel 26, located on the front side of housing 14 at a slightly reclined angle, provides a means for a user to input instructions to the blender. Snorkel 60 extends from the rear face of the housing; in other words, snorkel 60 is placed opposite panel 26.

Lower housing 18 is separable from upper housing 16 to form upper and lower halves of housing 14. The upper and lower housings attach around their outer periphery to enclose appliance components and electronics necessary within a hollow space (gasket 17 is not illustrated). A motor shroud 28 is fixed to the underside of housing top 22. Shroud 28 extends past the lower edge of upper housing 16. As illustrated and described further below, shroud 28 partially encloses a motor and motor fan. Shroud 28 can be of any shape or structure so as to direct or contain airflow over the motor. Moreover, shroud 28 limits access to the motor and fan when lower housing 18 is disengaged from upper housing 16, as when the appliance is installed in-counter.

Figure 2B:
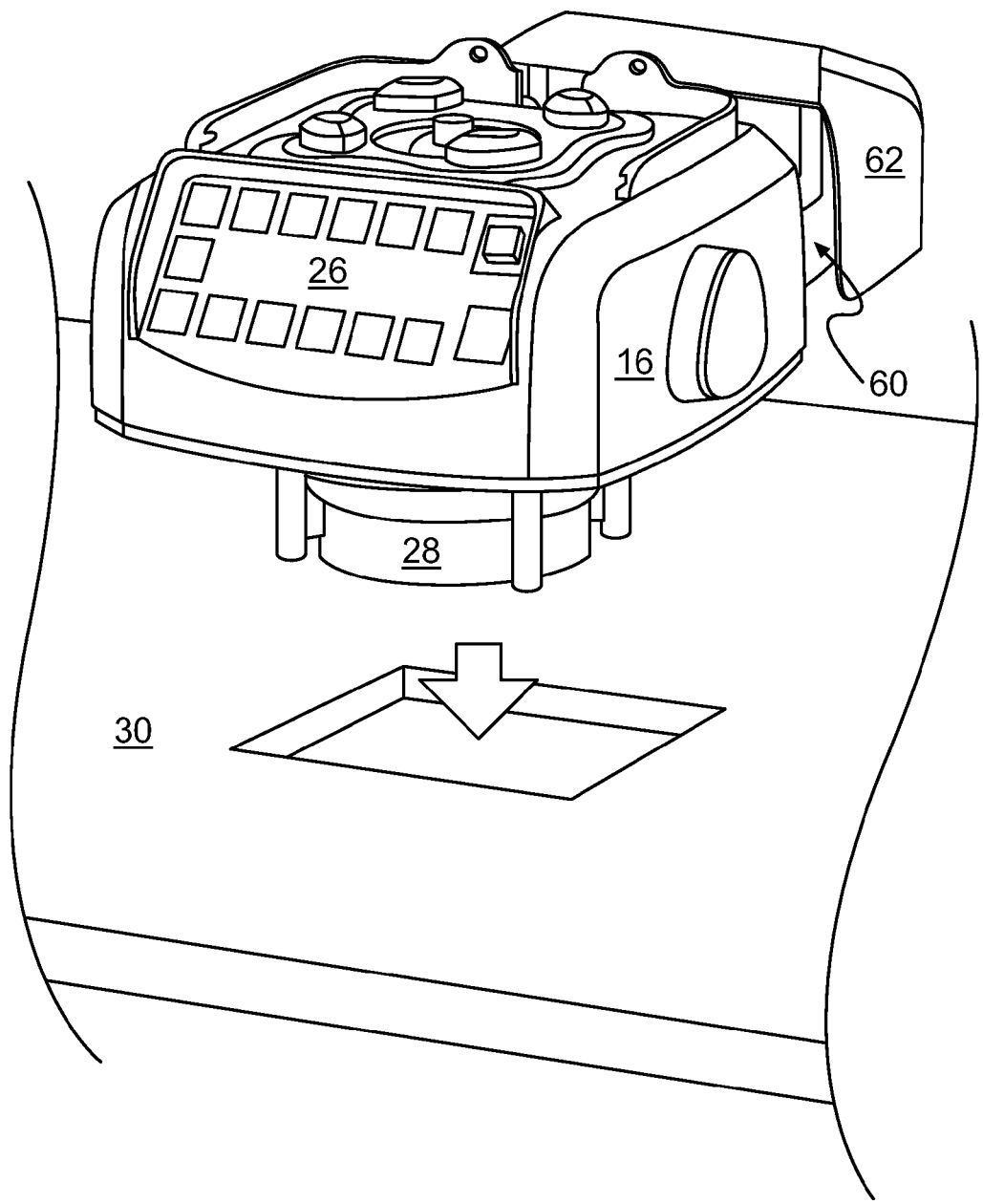
FIG. 2B is perspective view of the upper motor housing, motor shroud, and countertop as described herein for an in-counter installation.

Turning to FIG. 2B, for an in-counter installation, lower housing 18 is removed and shroud 28, the motor and fan are inserted into an appropriately sized opening of a countertop 30. The shroud, motor and fan extend into or through the plane defined by countertop 30.

Figure 2C:
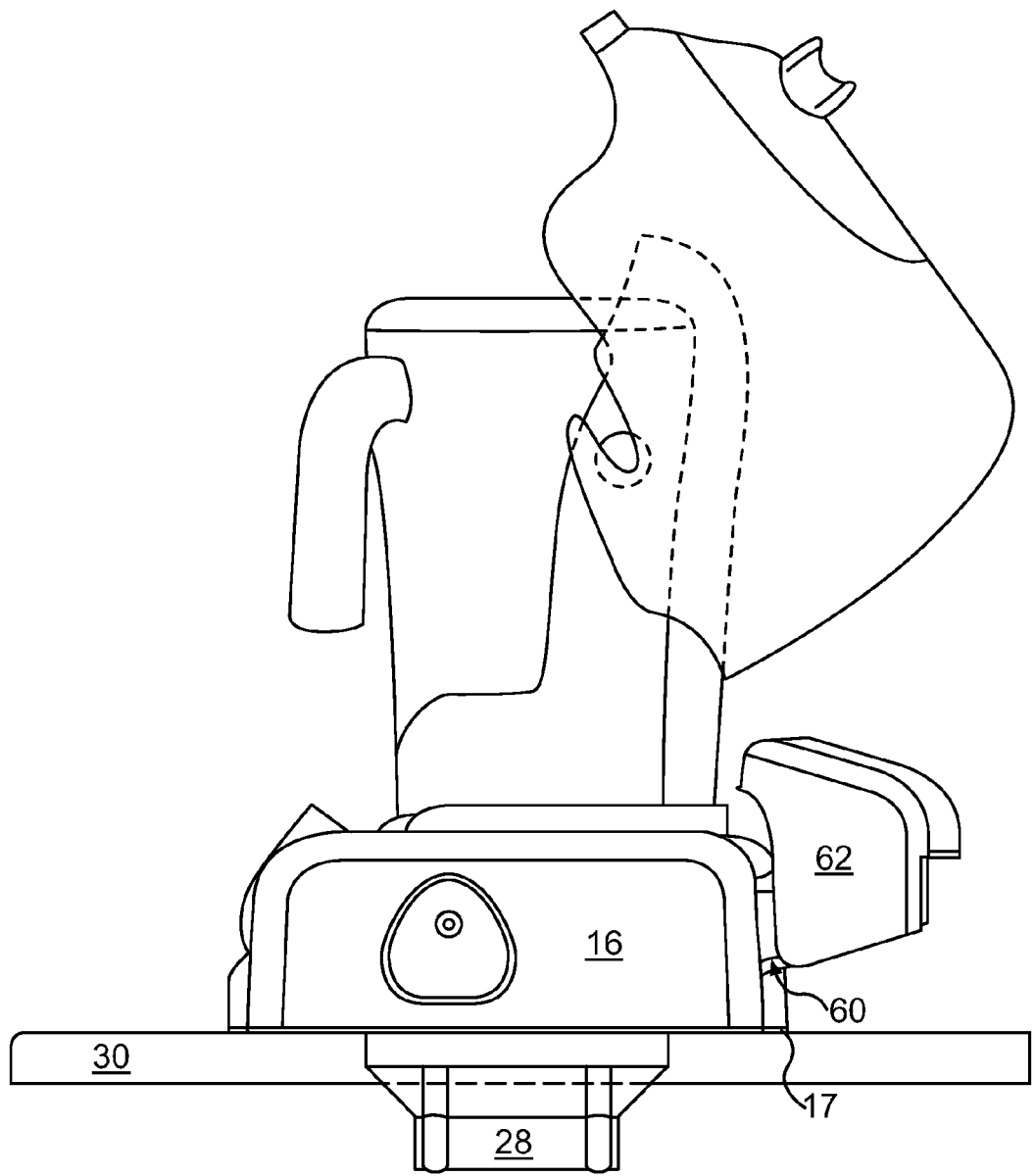
FIG. 2C is a side view of a blender including the air intake snorkel installed into an in-counter installation.

For an in-counter installation, as further illustrated in FIG. 2C, the bottom edge of upper housing 16 is flush with the top surface of countertop 30. Optional gasket 17 can act as a sound and air seal between upper housing 16 and countertop 30. Snorkel 60, and particularly the intake opening of snorkel 60, is located above countertop 30, which prevents any fluid or solids physically resting on the countertop from entering the snorkel. As described below, the intake opening is near or above the top side of the housing or the plane defined by the top side 22.

Figure 3A:
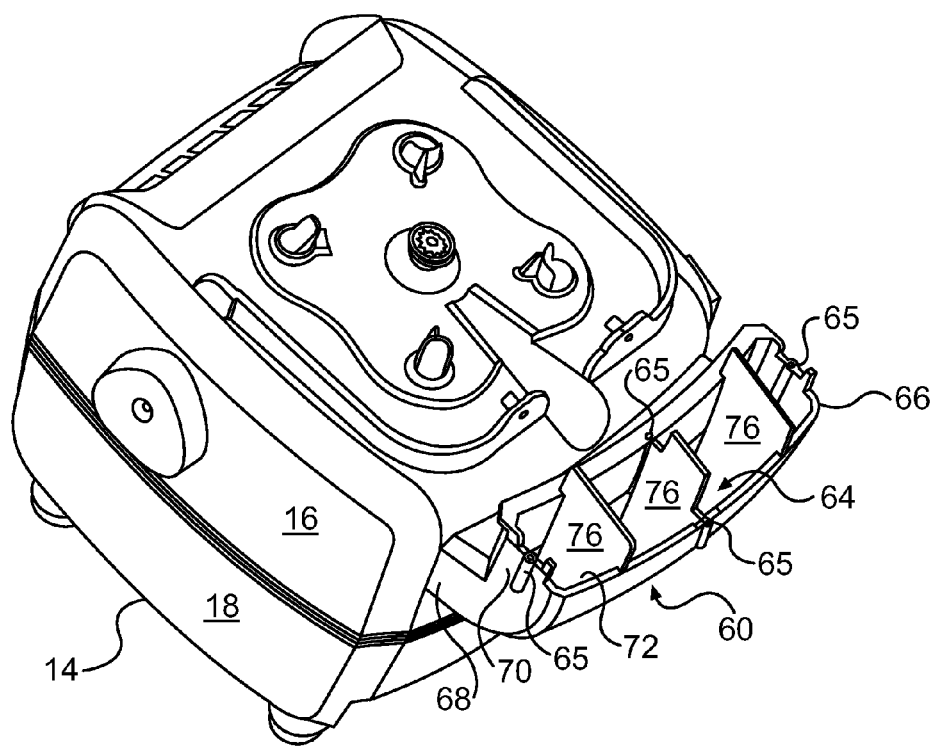
FIG. 3A is an perspective rear view of a blender motor housing including a snorkel assembly without a snorkel cap.
Figure 3B:
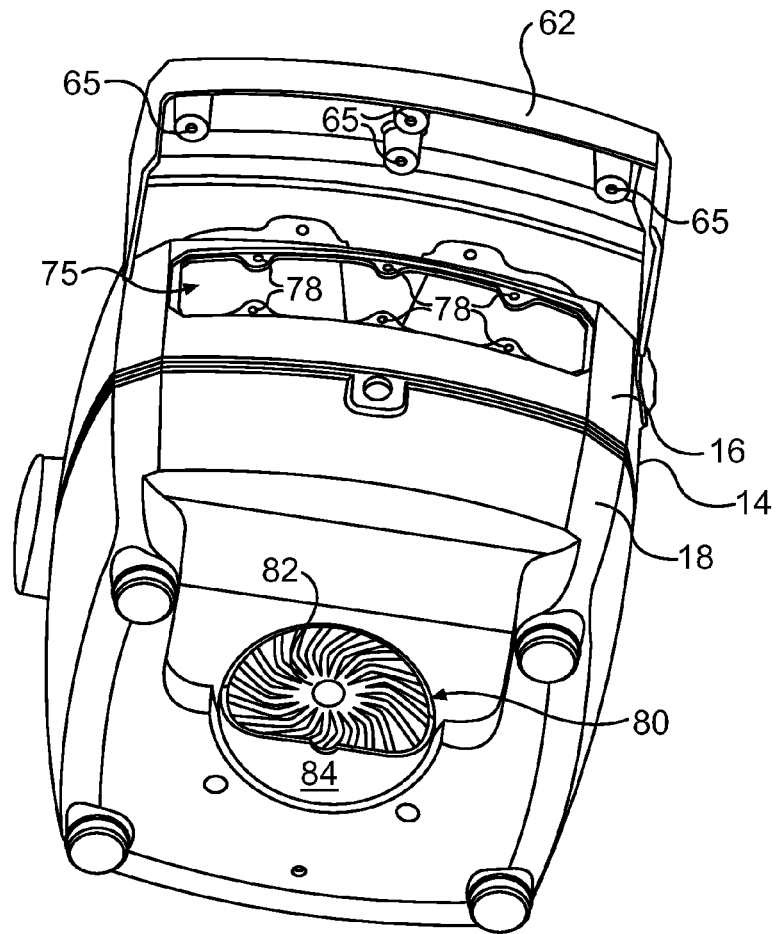
FIG. 3B is three-quarter bottom view of a blender with an air intake snorkel and motor housing as described herein.

The structure and operation of snorkel 60 is better understood when considering FIGS. 3A and 3B. In 3A, optional cap 62 is deleted so that the internal structure of snorkel 60 is visible, including an air conduit 64 defined by snorkel 60. Considering both figures SA and 3B, it should be understood that cap 62 can be secured to snorkel 60 by known means such as clips, adhesives, or the like. The cap could also be integrally formed with the snorkel. As illustrated, snorkel 60 and cap 62 include matching mounting points 65. Fasteners, adhesive or other means can be used to secure the corresponding mounting points to each other. It would be apparent to one of skill in the art of appliance manufacturing that various means could be employed to secure cap 62 to snorkel 60.

Snorkel assembly 60 includes a body 66 comprising molded plastic or a series of rigid, connected panels. Body 66 creates an elongated, hollow space with a first end, second end, and a cross-sectional shape, such as the rectilinear shape illustrated. The elongated hollow space can be bent along one or more angles or arcs placed between the first and second ends. Body 66 generally extends across the width of the rear side of housing 14, preferably on the upper half of housing 14 or on upper housing 16. The placement, size and shape of the snorkel, however, can be modified as needed.

In more detail, with reference to FIG. 3A, conduit 64 is essentially the hollow space created by body 66. In a preferred embodiment, body 66, and conduit 64, are bent at a single angle to form an L-shaped fluid passage comprising a first leg and a second leg. First leg 68 extends substantially or generally horizontally from housing 14. Second, substantially vertical leg 70 is joined to first leg 68 at a nearly 90-degree angle. Second leg 70 extends upwards from first, horizontal leg 68. The interior juncture of the first and second legs is preferably at least partially rounded, as is better illustrated by FIG. 4. Rounding the interior angle, or a portion of the interior angle, provides a more efficient and laminar airflow in comparison to straight edge angles. As a result, cooling efficiency is increased and the noise produced by air moving through conduit 64 is reduced. Air is pulled through the conduit, and hard corners create air flow turbulence by decelerating a portion of the airflow. The internal geometry of conduit 64 is intended to reduce turbulence, resulting in a more efficient and quiet laminar air flow.

The first end and the second end of snorkel 60 are open ends fluidly connected by conduit 64. The first exposed, vertically-facing end of conduit 64 acts as an intake opening 72 for snorkel 60. Entry to the intake opening occurs along a vertical axis. The second, horizontally-facing end of conduit 64 is mated to housing 14. The second end acts as an outlet opening 74 (FIG. 4) for snorkel 60. In use, air is drawn into intake opening 72. The air moves vertically downwardly through conduit 64 of second leg 70 before moving horizontally through conduit 64 of first leg 68. The air exits the conduit and enters housing 14. The shape of conduit 64 can be modified as needed.

An upward- or vertically-facing intake opening 72 is the preferred construction of snorkel 60. Using this construction, the optional cap 62 can be placed above the opening to prevent spills or accidental contamination of conduit 64 or housing 14. In another preferred embodiment, intake opening 72 is in-plane with, or located above, top side 22. The location of the upward facing intake opening in-plane with or above top side 22 provides cooler air, less recirculated exhaust, and a reduced possibility of vacuuming material into the housing relative to an intake opening or inlet aperture located below the top side 22. Using an up-turned intake opening 72 also ensures that the intake opening is moved some distance from a countertop where standing fluid or food may otherwise be drawn into the housing during operation of the appliance. It is also more difficult for the appliance fan to pull liquid or food vertically around snorkel body 66 into intake opening 72 relative to, say, a horizontally-facing intake opening.

One or more vertical dividers 76 can divide conduit 64 into a plurality of air flow channels. The dividers 76 provide structural support to snorkel body 66. Dividers 76 also segregate conduit 64 into multiple flow channels thereby reducing turbulence.

Access to the interior of housing 14 is provided by inlet aperture 75, as best viewed in FIG. 3B. In FIG. 3B, snorkel body 66 and vertical dividers 76 are deleted so as to better appreciate the operation of the snorkel and appliance. Instead, the underside of cap 62 and housing 14 are illustrated.

With body 66 removed, a plurality of housing anchor points 78 are revealed. The anchor points, which are located adjacent the periphery of inlet aperture 75, represent points at which snorkel 60 is connected with or mated to housing 14. One of skill in the art will appreciate that various methods for joining the snorkel to the appliance motor housing are available. Fasteners (not illustrated), such as screws, rivets, or bolts can join anchor points 78 to corresponding structure provided by snorkel 60. Snorkel 60 could also be adhered or clipped to housing 14.

The shape of inlet aperture 75 roughly corresponds to the cross sectional shape of snorkel 60. In the illustrated embodiment, the snorkel defines a roughly rectilinear cross sectional shape. Therefore, inlet aperture 75 is a corresponding rectilinear opening in the motor housing.

It should be understood that outlet opening 74 and inlet aperture 75 are immediately adjacent to each other. Therefore, conduit 64 fluidly connects intake opening 72 to inlet aperture 75. Air drawn into the motor housing by the motor fan moves through intake opening 72, conduit 64, outlet opening 74, and inlet aperture 75.

An exhaust aperture 80 is centrally located in the bottom side of the roughly cubical shape of housing 14. A grill 82 spans the area of exhaust aperture 80 to prevent access to the interior of motor housing 14. A baffle 84, extending beneath housing 14 directs warm exhaust air to the rear of the appliance or blender. Snorkel 60 locates the intake opening upwards and away from housing 14 and countertop 30 so that there is a reduced possibility of recirculating warm exhaust air as compared to conventional appliance or blender air intakes.

Figure 4:
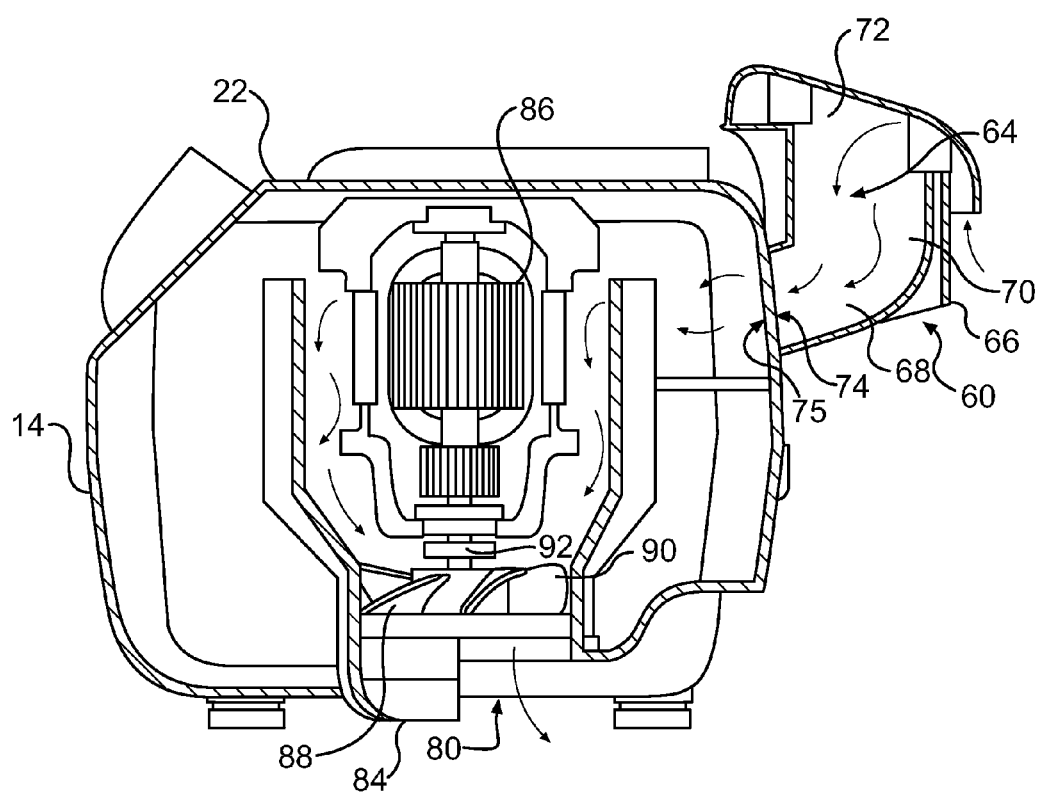
FIG. 4 is a cross-sectional view of the blender air intake snorkel and motor housing as described herein.

FIG. 4 further illustrates the operation of blender 10 in cross-section. An electric motor 86 is mounted to the top surface of housing 14. Mounted on the bottom of motor 86 is a fan 88. Fan 88 includes fan blades 90 and a central hub portion 92. When motor 86 is on, fan blades 90 draw air across motor 86 by exhausting air downwardly.

Where separable upper and lower housings are provided, a motor shroud would similarly be connected to the bottom of top side 22 (FIGS. 2B and 2C). Shroud 28 includes a recess into which is received motor 86. With or without shroud 28, as illustrated by following the arrows in FIG. 4, air is drawn through intake opening 72, conduit 64, outlet opening 74, inlet aperture 75, and an inlet passageway (identified by the air flow arrows inside housing 14). The cooling air flow moves around motor 86 downwardly over blades 90 and out exhaust aperture 80. Baffle 84 directs the warm exhaust air to the rear of the appliance.

Air that is exhausted by fan 88 is less likely to be recirculated around the motor because intake opening 72 of snorkel 66 is above the top side 22 of housing 14, or it is proximate to top 22 of housing 14. In other words, intake opening 72 is near the plane defined by top side 22 or is above the plane defined by top side 22. By this placement, snorkel 66 is drawing in fresh, cool air or, even if exhaust air is recirculated to the housing, the exhaust air has been cooled by or diffused with ambient air. For an in-counter installation, the exhaust air diffuses beneath the countertop.

Whether in-counter or on the countertop, snorkel 60 reduces the possibility of contaminants on the countertop entering the housing by displacing the air intake to a point near the top of or above housing 14. Specifically, snorkel intake opening 72 is in-plane with or above top side 22. 'Above', in this usage, meaning intake opening 72 is located farther away from a support surface upon which the blender rests relative to top side 22. Therefore, intake opening 72 is at least as far away from the countertop as a hypothetical plane defined by top side 22. The location away from the support surface reduces the recirculation of warm air and reduces the possibility of vacuuming material into the housing.

Cap 62 prevents objects from accidentally entering the snorkel. In at least one of the disclosed embodiments, inclusion of cap 62 on snorkel 60 also creates an upwardly vertical air flow before the cooling air enters the snorkel conduit 64. The upwardly vertical air flow limits the possibility that liquid or food will be vacuumed or drawn into the snorkel. The possibility of contaminating housing 14 is also thereby reduced.

The cross-sectional area of the inlet aperture 75 is substantially equal to the exhaust aperture 80. There are efficiencies obtained by maintaining substantially the same cross-sectional area through the air flow into the housing, across the motor, and out the outlet. By minimizing variations in the exhaust path, for instance, there is efficient outlet flow of the air. In other words, if the air is allowed to diffuse on its path through the appliance into a substantially larger passage, the efficiency is reduced. Where the lower housing is removed, the open end of the motor shroud is also of roughly the same area as the intake opening and inlet aperture.

As briefly described above, efficiency and laminar air flow is also improved upon by rounding the internal juncture between first leg 68 and second leg 70 of snorkel 60. The increase in efficiency and laminar air flow is also thought to reduce noise generated by the operation of fan 88.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. An air intake snorkel for a blender motor housing, the housing adapted to contain a motor and providing an inlet aperture wherein the motor comprises a fan operable to move air through the inlet aperture and across the motor, the snorkel comprising:
   an intake opening,
   an air conduit,
   an outlet opening, the air conduit fluidly connecting the air intake opening to the outlet opening; and
   wherein the snorkel is mated to the blender housing and the outlet opening is fluidly connected to the blender housing inlet aperture the snorkel further comprising a first leg extending generally horizontally from the blender housing and the blender housing inlet aperture, a second leg joined to the first leg, the second leg extending generally vertically and upwards from the first leg, the second leg providing the intake opening.

2. The air intake snorkel of claim 1, the snorkel further comprising vertical dividers, the dividers separating the air conduit into multiple air flow channels.

3. The air intake snorkel of claim 1, further comprising a cap attached to the snorkel adjacent to the intake opening, the cap operable to shield the intake opening from contamination, the cap further creating an upward, vertical air flow route prior to the air entering the intake opening, the upward, vertical air flow reducing the possibility of vacuuming solids or fluids from the space proximate to the intake opening.

4. The air intake snorkel of claim 1, wherein the blender motor housing comprises a blender base, the blender base further comprising an upper housing and a lower housing, the upper and lower housings selectively separable from each other, and wherein the snorkel is mated to the upper housing.

5. The air intake snorkel of claim 4, the snorkel further comprising a first leg extending generally horizontally from the blender housing and the blender housing inlet aperture and a second leg joined to the first leg, the second leg extending generally vertically and upwards from the first leg, the second leg providing the intake opening.

6. The air intake snorkel of claim 5, wherein the blender housing defines a shape with substantially vertical side walls, a top side and a bottom side, the top and bottom sides enclosing the space between the substantially vertical walls, the snorkel intake opening located in-plane with or above the top side of the housing.

7. The air intake snorkel of claim 6, wherein the location of the snorkel intake opening in-plane with or above the top side of the housing is operable to draw cooler air into the housing relative to an inlet aperture located below the top side of the housing.

8. The air intake snorkel of claim 6, wherein the location of the snorkel intake opening in-plane with or above the top side of the housing is operable to reduce the vacuuming of fluids and solids located on a support surface upon which the blender rests relative to a inlet aperture or intake opening located below the top side of the housing.

9. A blender comprising:
a blender base, the blender base comprising an external shell and including substantially vertical walls, a top side, and bottom side, the top and bottom sides enclosing the space between the substantially vertical walls, the external blender base shell enclosing a motor, a motor shroud, and an air inlet passageway, the external blender base shell further comprising an air inlet aperture, the air inlet passageway defining a fluid path from the blender base inlet aperture around the motor,
an air intake snorkel connected to the external blender base shell, the snorkel extending externally away from the blender base's shell, the snorkel further comprising an intake opening, a conduit, and an outlet opening, the snorkel intake opening fluidly connected to the blender base inlet aperture and air inlet passageway, the snorkel further comprising a first leg extending substantially horizontally from the blender housing and the blender base inlet aperture and a second leg joined to the first leg, the second leg extending substantially vertically and upwards from the first leg, the second leg providing the snorkel intake opening,
a fan operable to create an air flow through the conduit and blender base air inlet passageway; and
wherein the snorkel intake opening is located in-plane with or above the top side of the blender base relative to a surface upon which the blender base rests.

10. The blender as described in claim 9, further comprising a cap attached to the snorkel adjacent to the snorkel intake opening, the cap located externally of the snorkel conduit.

11. The blender as described in claim 10, wherein the cap creates an upward, vertical air flow route prior to the air entering the snorkel intake opening.

12. The blender as described in claim 9, wherein the location of the snorkel intake opening in-plane with or above the top side of the blender base is operable to draw cooler air into the blender base relative to a snorkel intake opening or blender base inlet aperture located below the top side of the blender base.

13. The blender as described in claim 9, wherein the location of the snorkel intake opening in-plane with or above the top side of the blender base is operable to prevent the vacuuming of fluids and solids located on a support surface upon which the blender rests.

14. The blender as described in claim 9, wherein the first leg and second leg are joined at a juncture, the conduit at least partially rounded at the juncture, wherein the rounded juncture is operable to provide a less turbulent and quieter air flow relative to a non-rounded juncture.

\* \* \* \* \*